Feb. 26, 1957 L. E. THOMPSON ET AL 2,783,420
DIELECTRIC SENSITIVE APPARATUS
Filed Aug. 9, 1952 2 Sheets-Sheet 1
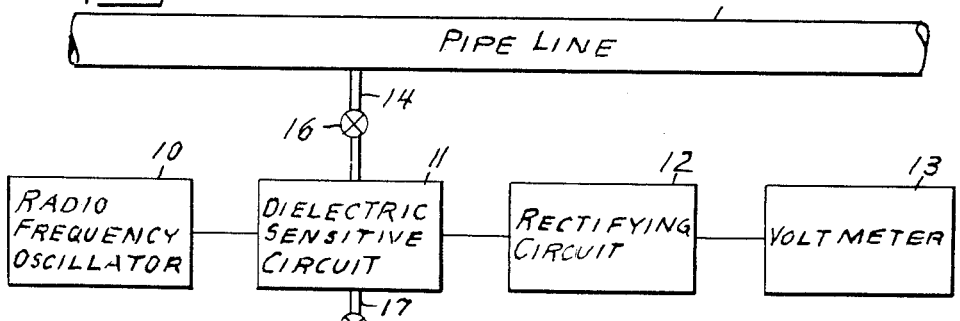
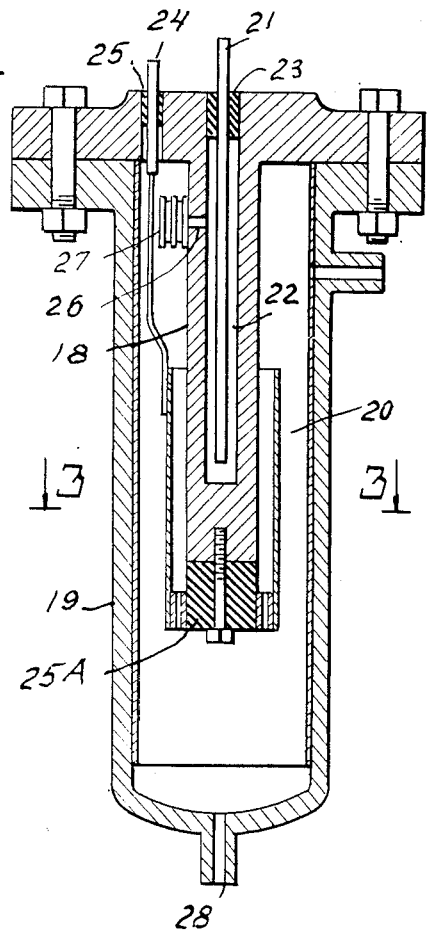
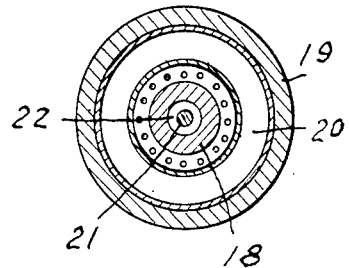
INVENTORS
LEE E. THOMPSON
LAWRENCE W. STINSON
BY
Adams, Forward and McLean
ATTORNEYS

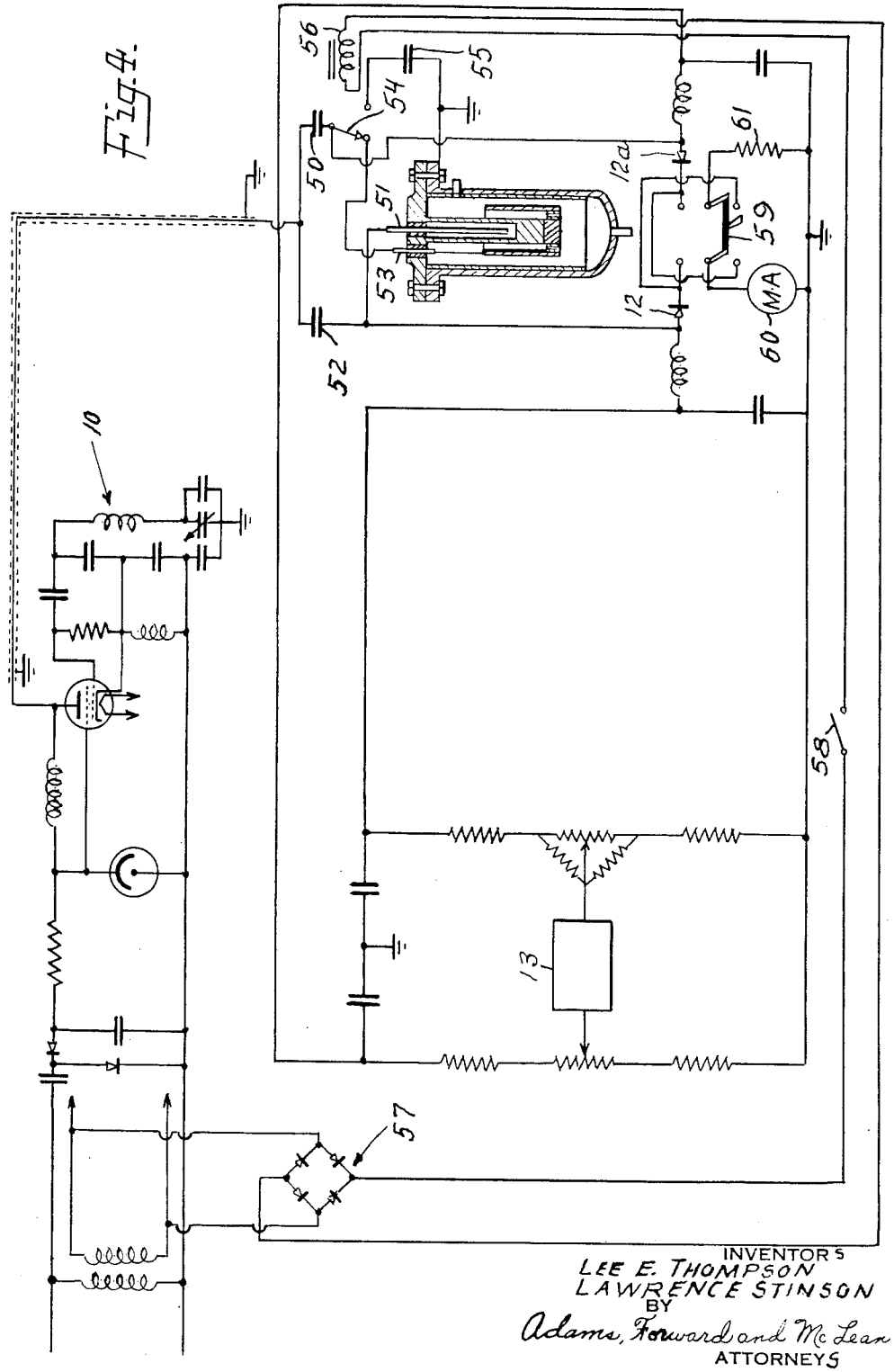

United States Patent Office 2,783,420
Patented Feb. 26, 1957

2,783,420

DIELECTRIC SENSITIVE APPARATUS

Lee E. Thompson and Lawrence W. Stinson, Tulsa, Okla., assignors to Sinclair Research Laboratories, Inc., Harvey, Ill., a corporation of Delaware Application August 9, 1952, Serial No. 303,558

4 Claims. (Cl. 317—246)

Our invention relates to method and apparatus for automatic and continuous fluid flow analysis and recording. More particularly our invention relates to method and apparatus for continuously monitoring the flow of hydrocarbons, particularly illustrated in systems for automatically monitoring pipeline valve switching operations.

Accurately monitoring the flow of hydrocarbons through a pipeline is difficult. Petroleum products are transported at relatively high rates of flow through opaque conduits, and the various hydrocarbons moved in such a system may possess very similar properties, making precise differentiation difficult. For example, in oil products pipelines, maximum utility of the conduits and lines usually requires constant use of the system. This is ordinarily accomplished by passing the different products successively through the pipeline, that is, one right behind the other. Thus, without proper control, it is difficult to avoid inadvertently mixing or contaminating the several fractions emerging at the delivery, or any intermediate, point. A conventional method of ascertaining a change in the quality of the materials passing through the pipe is to take periodic samples from the line by means of a small bleed or sample stream and to identify the hydrocarbon by testing for its specific gravity. However, this method is not particularly accurate in determining product quality; and it requires a considerable amount of time. Another method includes taking similar periodic samples from the pipeline and testing for quality by means of flash temperatures. Although this analysis is more accurate in characterizing the hydrocarbon, it is more time consuming and thus results in the accumulation of undesirably large slop quantities during the switching from one product to another, and, generally, most of these control methods alter or destroy in some way the product monitored.

It has been proposed to identify petroleum products, or, what is usually more practicable in the commercial sense, to detect a change in composition of petroleum fractions or products by changes in their dielectric properties. Since the dielectric constants of hydrocarbon fractions vary directly with their gravity and almost directly with the square of their refractive indices, a measure of the dielectric property may be made to serve as a measure of the gravity and refractive index of a hydrocarbon sample and thus as a means for identifying its character. When a hydrocarbon fraction is passed between the electrodes of a dielectric cell, a definite capacitance is produced and a small change in the composition of the material passing through the cell produces a change in the capacitance which may be detected and caused to operate an electronic signalling device or a recording circuit after appropriate rectification and amplification. For example, as little as 0.284 volume percent of gasoline in kerosene corresponding to a zero gravity change, a 7° F. change in Tag closed cup flash and 0.0001 at 20° C. change in refractive index can be detected by capacitance change.

There are several practical difficulties, however, in the way of design and use of commercial apparatus for detecting a change in composition of a flowing hydrocarbon stream by a change in its dielectric properties. We have found, for example, that pressure has a pronounced effect on dielectric measurements of petroleum products in addition to the effect of temperature on such dielectric measurements. Measurement of the dielectric value of the product flowing is also affected by build-up of sediment on the cell plates. Thus means for compensation for differences in pressure and temperature between the reference hydrocarbon and the test hydrocarbon must be provided if accurate measurements are to be obtained. Our invention provides automatic means for compensation for differences in pressure and temperature between the reference hydrocarbon and the test hydrocarbon by utilizing two dielectric cells, a reference cell for the reference hydrocarbon and a sensing cell for the test hydrocarbon, situated in heat exchange relationship with each other and having pressure equalizing means between them. Also we have substantially eliminated inaccuracies due to the build-up of sediment on the cell plates by arranging the cells in a vertical position.

Accordingly, we have devised a composite dielectric sensitive capacitance-type cell for detecting a change in composition of a hydrocarbon fraction by detecting a change in its dielectric properties in which the capacitance-type cell containing the reference dielectric is enclosed within the capacitance-type cell containing the flowing hydrocarbon stream to be analyzed and interconnected with such cell, as by means of a flexible diaphragm, in such a manner that the reference dielectric and the flowing hydrocarbon stream are always at substantially the same temperature and pressure. The composite dielectric sensitive cell includes a first chamber having electrically conductive walls adapted to contain a hydrocarbon dielectric and having an electrode supported within the chamber and insulated from the chamber walls, a second chamber having electrically conductive walls enclosing the first chamber and forming an annular space about its walls, a second electrode supported within the annular space and insulated from the walls of both chambers, openings in the second chamber wall for introducing a hydrocarbon fraction into and withdrawing it from the annular space, and a passage from the first chamber leading to the annular space having a flexible diaphragm interposed therein.

The novel composite cell of our invention is advantageously incorporated in an electrical system which comprises a source of regulated alternating potential of substantially constant radio frequency, a dielectric sensitive bridge circuit including a fixed impedance and the reference cell in one leg of the bridge and a fixed impedance and the sensing cell in the other leg of the bridge, and a voltage differential detecting device including a rectifier for determining the degree of unbalance between the reference cell and the sensing cell.

In the accompanying drawings we have illustrated a preferred embodiment of our invention adaptable for use as a control or monitor for a petroleum product system such as a pipeline.

Figure 1 is a block diagram illustrating the control schematically while Figure 2 illustrates a composite cell that is especially useful for sample streams taken from the pipeline. Figure 3 is a cross-section of Figure 2 taken along line 3—3. Figure 4 is an electrical circuit diagram of the entire control system of Figure 1.

As illustrated in Figure 1, the control comprises an alternating voltage source, preferably radio frequency oscillator 10, the dielectric sensitive circuit or connection 11 including the composite capacitance-type cell rectifying circuit 12, and means for recording the signal passed through the dielectric sensitive circuit 11, advantageously a continuous recording chart voltmeter 13.

The control is operated as follows: A sample or bleed stream 14 is taken off from pipe line 15 by opening valve 16. The stream is passed through the composite dielectric sensitive cell, leaving the system by line 17. The dielectric sensitive circuit is energized by oscillator 10 which impresses a radio frequency voltage on this connection. The signal so developed is rectified in rectifying circuit 12 and then measured by continuous recording chart voltmeter 13.

The composite dielectric sensitive capacitance-type cell illustrated in Figure 2 is composed of two cylindrical electrically conductive chamber walls 18 and 19 with chamber wall 18 concentrically arranged within chamber wall 19, the petroleum product or dielectric material to be analyzed flowing through the annular space 20 between the chamber walls. Electrode 21 is suspended within chamber 22 and insulated by insulation 23 from chamber wall 18. Electrode 24 is suspended within annulus 20 and is insulated from chamber wall 19 by insulation 25 and from chamber wall 18 by insulation 25A. Advantageously, electrode 24 is cylindrical and is concentrically arranged around the outside of chamber wall 18. Passage 26 through chamber wall 18 is provided with bellows 27 for pressure equalization between the fluid dielectric in annulus 20 and the fluid dielectric within chamber 18. A passageway 28 is provided in chamber wall 19 for introduction of a side stream of the petroleum products from the pipe line and another passage is provided in chamber wall 19 for withdrawal of this side stream. Thus when the reference dielectric fluid is supplied to chamber 22, it assumes the pressure and temperature of the petroleum product dielectric flowing through the annulus 20.

Figure 4 is an electrical circuit diagram for a control system of the type illustrated in the block diagram of Figure 1. The system comprises essentially a dielectric sensitive bridge circuit including condenser 50 and reference cell 51 in one leg of the bridge and condenser 52 and sensing cell 53 in the other leg of the bridge, a radio frequency oscillator 10 including a regulated source of direct voltage and a vacuum tube oscillator circuit, means for comparing the voltage drop across sensing cell 53 with respect to the voltage drop across reference cell 51 including rectifiers 12 and 12A associated with cells 53 and 51 respectively adapted to rectify the radio frequency alternating voltage drop across the respective cells, and a resistance bridge including a continuous recording chart voltmeter 13, such as a Brown Electronik high gain single point D. C. voltage recorder with a range from 0 to 50 millivolts.

Advantageously, a single pole double throw switch 54 is connected in the dielectric sensitive bridge circuit so that a condenser 55 of standard value may be substituted for reference cell 51 in the circuit. Switch 54 in the illustrated arrangement is operated by relay 56 energized by a source of low direct current voltage 57 and controlled by switch 58. Double pole double throw switch 59 is connected to rectifiers 12 and 12A on one side and to milliammeter 60 and resistor 61 having a resistance equal to milliammeter 60 on the other side in a polarity reversing arrangement permitting meter 60 to indicate the current flow through rectifiers 12 or 12A as desired.

Preferably, the alternating voltage source is an oscillator and may vary widely both as to frequency and voltage impressed upon the connection comprising the bridge circuit, depending largely on the petroleum products in the system. That is, since alternating voltages of varying frequencies may be used to energize the bridge circuit, it is only necessary to provide proper reactance values for the circuit which will vary with the dielectric passing through the sensing cell. The difference in alternating voltage found across the reference and sensing cells is then rectified, say, by a germanium crystal diode, whereupon the signal derived from the potential is recorded. Advantageously, this signal may be measured on a voltmeter having a continuous recording means, say a moving chart marked by a stylus, so that a continuous and accurate record is available. The voltage source is advantageously a radio frequency source of about 2.64 megacycles. The frequency is selected to give a reasonable reactance value for the cell employed. We have found that a frequency in the two megacycle range gives a reactance value of suitable magnitude, about 5000 ohms, for a cell of 20 micro-micro farads capacity.

It is important to maintain as continuous a voltage to the bridge circuit as possible since any fluctuation in the voltage will be picked up in the recorder. The rectifier for supplying power to the radio frequency oscillator ordinarily is a well-regulated rectifier circuit and hence further regulation is usually unnecessary. In addition, however, all A. C. power to the instrument may be delivered from a Sorensen electronic voltage regulator or other conventional type regulator circuit.

Our apparatus for continuously monitoring a fluid hydrocarbon system may be adapted for a variety of uses other than as a pipeline control. For instance, our invention may be employed as a process control aid in fractionation. That is, variations in overhead compositions will be readily detected by changes in the dielectric properties of the overhead. It may be used in conjunction with electrically operated valves, for example, automatically to switch the flow of various hydrocarbon streams to desired tanks or receiving vessels. In further example, it may be used to detect the presence of very small quantities of water in hydrocarbon streams, say in the hundredths of 1 percent range.

We claim:

1. A composite dielectric sensitive capacitance type cell for detecting a change in composition of a flowing hydrocarbon stream by a change in its dielectric properties which comprises a reference cell situated within a sensing cell, said two cells having a common electrode therebetween and each of said cells having a second electrode insulated from said common electrode, means for introducing a reference hydrocarbon to the reference cell, means for introducing a hydrocarbon stream into and withdrawing it from the sensing cell providing a flow around the reference cell, and pressure equalizing means responsive to the pressure in one cell to maintain the pressure in the other cell equally interposed between the cells.

2. A composite dielectric sensitive capacitance type cell for detecting a change in composition of a fluid hydrocarbon stream by a change in its dielectric properties which comprises a first chamber having electrically conductive walls adapted to contain a fluid dielectric and having an electrode supported within it and insulated from its walls, an opening for introducing a reference fluid dielectric into the chamber, a second chamber having electrically conductive walls enclosing the first chamber forming an annular space, a second electrode supported within the annular space and insulated from the walls of both chambers, openings for introducing a fluid hydrocarbon stream into and withdrawing it from the annular space, and a passage from the first chamber connecting with the annular space having a flexible diaphragm interposed therein.

3. A composite, dielectric sensitive capacitance type cell for detecting a change in composition of a flowing hydrocarbon stream by a change in its dielectric properties which comprises a reference cell situated in heat exchange relationship with a sensing cell, means for introducing a reference hydrocarbon to the reference cell, means for introducing a hydrocarbon stream into and withdrawing it from the sensing cell providing flowing contact with the reference cell, and pressure equalizing means responsive to the pressure in one cell to maintain the pressure in the other cell equally interposed between the cells.

4. In a system for detecting a change in the composition of a flowing hydrocarbon stream by a change in its dielectric properties the apparatus comprising a conduit for transporting the hydrocarbon stream, a dielectric sensitive capacitance type cell including a reference cell situated in heat exchange relationship with a sensing cell, means for introducing a reference hydrocarbon to the reference cell, and pressure equalizing means responsive to the pressure in one cell to maintain the pressure in the other cell interposed between the reference and sensing cells, and means for passing hydrocarbon from the transporting conduit into and withdrawing it from the sensing cell providing flowing contact with the reference cell.

References Cited in the file of this patent

UNITED STATES PATENTS

| 2,485,579 | Elliott | Oct. 25, 1949 |
| 2,599,583 | Robinson et al. | June 10, 1952 |
| 2,623,928 | Bower | Dec. 30, 1952 |